(12) United States Patent
Geiger et al.

(10) Patent No.: US 9,323,813 B2
(45) Date of Patent: Apr. 26, 2016

(54) METHOD FOR PROVIDING AT LEAST ONE SERVICE WITH AT LEAST ONE ITEM OF FORMATTED ASSESSMENT INFORMATION ASSOCIATED WITH A DATA RECORD

(71) Applicant: AUDI AG, Ingolstadt (DE)

(72) Inventors: Thomas Geiger, Regensburg (DE); Alexander Hanke, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 483 days.

(21) Appl. No.: 13/785,416

(22) Filed: Mar. 5, 2013

(65) Prior Publication Data
US 2013/0232136 A1    Sep. 5, 2013

(30) Foreign Application Priority Data

Mar. 5, 2012    (DE) .......................... 10 2012 004 435

(51) Int. Cl.
*G06F 17/30* (2006.01)
*G06Q 30/02* (2012.01)

(52) U.S. Cl.
CPC .......... *G06F 17/30554* (2013.01); *G06Q 30/02* (2013.01)

(58) Field of Classification Search
CPC .... H04W 4/00; G06F 17/30554; G06Q 30/02
USPC .......................................................... 381/86
See application file for complete search history.

(56) References Cited

U.S. PATENT DOCUMENTS

| | | | |
|---|---|---|---|
| 2004/0116088 A1* | 6/2004 | Ellis et al. ...................... | 455/132 |
| 2008/0156173 A1* | 7/2008 | Bauer ............... | G06F 17/30026 84/601 |
| 2009/0319341 A1* | 12/2009 | Berkobin et al. ................ | 705/10 |
| 2010/0082731 A1* | 4/2010 | Haughay et al. .............. | 709/203 |
| 2010/0125531 A1* | 5/2010 | Wong ..................... | G06Q 30/02 705/347 |
| 2011/0035031 A1* | 2/2011 | Faenger ................... | G06N 5/02 700/94 |
| 2011/0040707 A1* | 2/2011 | Theisen et al. .................. | 706/12 |
| 2011/0238752 A1* | 9/2011 | Weiss et al. .................... | 709/204 |
| 2012/0039248 A1* | 2/2012 | Schneider et al. ............ | 370/328 |
| 2012/0149345 A1* | 6/2012 | Jotanovic ................... | 455/414.1 |
| 2012/0158845 A1* | 6/2012 | Baalu et al. .................... | 709/204 |
| 2012/0197709 A1* | 8/2012 | Kendall ............. | G06Q 30/0207 705/14.36 |
| 2012/0227086 A1* | 9/2012 | Dale et al. .......................... | 726/3 |
| 2013/0030645 A1* | 1/2013 | Divine et al. ................... | 701/36 |
| 2014/0280552 A1* | 9/2014 | Ng et al. ....................... | 709/204 |

FOREIGN PATENT DOCUMENTS

DE    10 2011 080 303    2/2012

OTHER PUBLICATIONS

Article entitled "Toyota Adds Pandora Option to 2012 Models", by Archer, dated 2011.*

* cited by examiner

*Primary Examiner* — Mahesh Dwivedi
(74) *Attorney, Agent, or Firm* — Staas & Halsey LLP

(57) ABSTRACT

At least one service is provided with at least one item of formatted assessment information associated with a data record, the formatted assessment information having a format which is predefined by the service and is predefined with regard to a multilevel assessment scheme having a number of assessment levels. A first item of assessment information associated with the data record is generated on the basis of a detected user specification. A plurality of items of formatted assessment information which are associated with the data record and correspond to format specifications of different services are derived from the first assessment information. The assessment information generated in this manner is made available to the services.

19 Claims, 2 Drawing Sheets

METHOD FOR PROVIDING AT LEAST ONE SERVICE WITH AT LEAST ONE ITEM OF FORMATTED ASSESSMENT INFORMATION ASSOCIATED WITH A DATA RECORD

CROSS REFERENCE TO RELATED APPLICATIONS

This application is based on and hereby claims priority to German Application No. 10 2012 004 435.6 filed on Mar. 5, 2012, the contents of which are hereby incorporated by reference.

BACKGROUND

Recent developments known under the keywords Web2.0 or Social Media use the existing, worldwide network of computers (Internet) to make it possible for many internetworked users to interactively interchange information. Assessment and commenting are crucial basic functions in this case which are applied to data records, in particular data records containing media data. Users are often registered with many portals or with different services which provide different functionalities. In the case of media data in particular, such as music titles or videos, there are many possibilities for carrying out actions on the basis of an assessment. For example, video contributions can be sorted in an online portal, favorites lists can be created or an item of meta information associated with the data record can be communicated together with the personal rating in social networks. A genre, title or performer name of a music title, in particular, comes into consideration here as meta information.

Further examples are the creation of personal favorites lists, in particular locally or in online radio aggregators on the Internet, the automatic creation of playlists on the basis of an assessment carried out by the user and the possibility, available in many places on the Internet, of using a mouse click on a button intended for assessment to declare whether the user is enjoying the media content displayed on a website, for example.

Different online music services provide, for example, music recognition services which are able to associate meta data with unknown, digital or analog music data. Other online music services make it possible to select similar music depending on preference or the musical style currently being listened to. Personalized radio plays music which corresponds, to the greatest possible extent, to currently selected preferences and is individually adjusted on the basis of user interaction. The inclusion of data records or media data, in particular media data corresponding to music titles, in social networks is becoming standard in more and more services. Recent developments show an increasing availability of media contents and widespread interweaving of individual services.

The availability of devices which provide a connection to the Internet is constantly increasing. In this respect, reference is made to the development of so-called smartphones or other communication devices with Internet capability such as netbooks, tablet PCs, handheld consoles or ebook readers. The provision of a connection to the Internet for a driver of a motor vehicle if required has likewise been established for some years. In this case, large displays and powerful computers of modern multimedia infotainment systems make it possible to use online functionalities even during the journey. However, continuous provision of the connection to the Internet from the motor vehicle is typically not provided.

In this case, the portable communication device, in particular the smartphone, is frequently used as an interface to the Internet even during use from a motor vehicle. It is likewise known to adapt applications, so-called "apps", installed on the communication device for use in the motor vehicle. For example, applications for portable communication devices, in particular navigation applications, which are provided with enlarged virtual operating elements for use in the motor vehicle are known. These are typically associated with regions of a touch-sensitive surface of the smartphone. It is likewise known to transfer the display of the portable communication device to a display in the motor vehicle, in particular of the multimedia infotainment system. The portable communication device may be connected to an input unit in the motor vehicle and may thus be used in a motor vehicle. The multiplicity of Web2.0 services results in problems with the multilevel assessment schemes which are used and typically predefine different numbers of assessment levels. For example, a user wishing to give a positive assessment of a piece of music must make a corresponding user specification for each social network or for each playlist to be created.

SUMMARY

One possible object is therefore to specify a method which makes it possible to efficiently use, in terms of time, different services which require the provision of formatted assessment information.

The inventors propose a method of the type mentioned at the outset, a first item of assessment information associated with the data record being generated on the basis of a detected user specification and a plurality of items of formatted assessment information which are associated with the data record and correspond to format specifications of different services being derived from the first assessment information, and the assessment information generated in this manner being made available to the services.

The format of the formatted assessment information, in particular the number of assessment levels, is predefined by the respective assessment scheme of the external service. The formatted assessment information for use for the service is automatically derived from the first assessment information generated by the user. This is preferably effected using suitable algorithms. For example, a continuous value from a predefined interval is determined as the first assessment information, different ranges of values of the interval being associated with different assessment levels of the externally predefined assessment scheme. The association of the different ranges of values of the interval with the different assessment levels of the external service can be stored, in particular, in the form of a translation table. The derivation of the formatted assessment information from the first assessment information is preferably unambiguous.

A plurality of items of formatted assessment information which accordingly correspond to different services are derived from the first assessment information. The derived formatted assessment information is made available to the service using suitable transmission devices. The different services typically have different multilevel assessment schemes. For example, a social network provides binary assessment with only two assessment levels. Only the assessment levels "unrated" and "like" are typically distinguished here. A trading platform for music titles or similar media data, such as digital images, allows user assessment of the associated data records, for example, a five-level assessment scheme being used. A multiplicity of items of formatted assessment information which correspond to one another and are made available to the respective services can be derived from the user operating specification and the resultant first assessment information using the method. Therefore, the user has to make only a one-off specification in order to make the desired information available to a multiplicity of services which may comprise, in particular, online radios, social networks, Internet auction platforms and/or the like.

When transmitting the formatted assessment information to a social network, provision is made for an accompanying comment which is made available to the users of the social network to be additionally transmitted. In particular, the comment may be based on a voice input which is recognized and converted into text before transmission to the social network. This makes it possible for the assessment to be associated with an accompanying comment.

The user specification is preferably detected using an input unit in the motor vehicle. Provision is made, in particular, for the assessment of data records to be made easier for a mobile user, for example a driver of a motor vehicle.

In this respect, one preferred exemplary embodiment provides for the input unit in the motor vehicle to be designed for voice detection and possibly for voice recognition. Alternatively, voice can also be recognized using an Internet service which is called for this purpose and translates the user specification into text online. The user specification can therefore be effected acoustically.

The first assessment information is generated using an evaluation unit in the motor vehicle, which is connected to the input unit in the motor vehicle. Alternatively, the first assessment information is generated using the portable communication device. The formatted assessment information is derived from the first assessment information using the evaluation unit in the motor vehicle or the portable communication device. Alternatively, another exemplary embodiment provides for the formatted assessment information to be derived using a computer device which is connected to the Internet and is, for example, in the form of a server of a network for communicating with a multiplicity of motor vehicles. Another exemplary embodiment provides for the computer device to be in the form of an Internet proxy server. In another alternative exemplary embodiment, the formatted assessment information is derived using the portable communication device, in particular using the mobile telephone or the smartphone.

It goes without saying that, in order to derive the formatted assessment information in the computer device, the first assessment information associated with the data record must be transmitted to the computer device. Provision is accordingly made for at least one communication unit in the motor vehicle to be provided for the purpose of transmitting the first assessment information associated with the data record. The communication unit in the motor vehicle is also used to transmit the formatted assessment information associated with the data record to the corresponding service. Alternatively, the portable communication device, in particular the smartphone, can be used to transmit the first assessment information or the formatted assessment information.

In order to use the portable communication device in the motor vehicle, the communication device is operatively connected to the input unit in the motor vehicle and/or to the evaluation unit. In particular, provision is made for the portable communication device to be connected to the input unit in the motor vehicle and/or to the evaluation unit in a wireless or wired manner. The communication device is then accordingly used when transmitting the first assessment information or the formatted assessment information to the computer device or to one of the services being used. This makes it possible to assess data records from a motor vehicle even when the latter is not designed to communicate with the services, in particular the Internet services.

The first assessment information and/or the formatted assessment information is transmitted together with the data record or an item of identification information identifying the data record, with the result that the association of the first assessment information and/or the formatted assessment information with the data record is retained during transmission. So-called meta data, in particular, come into consideration as identification information if the data record contains media content, in particular a music title. The data record may accordingly contain audio data corresponding to a music title. Meta data may be, in particular, a performer name, music title name and/or genre name.

In particularly preferred exemplary embodiments, the assessed data record and/or the identification information identifying the data record is/are stored together with the first assessment information and/or the formatted assessment information if the first assessment information reaches or exceeds a predefinable threshold value. In particular, the data record and/or the identification information identifying the data record is/are stored together with the first assessment information and/or the formatted assessment information if the data record has been given a sufficiently good assessment. This makes it possible to automatically create databases, in particular of so-called playlists. For example, a music title which is received in the motor vehicle and was transmitted by a radio transmitter may be labeled as a favorite with a sufficiently good assessment and may be added to a favorites list or playlist locally present in the motor vehicle. Such an operation typically comprises a plurality of intermediate steps since radio transmitters usually do not transmit any meta data relating to the transmitted music title. Music recognition which identifies the music title must therefore be carried out first of all. The corresponding title can then be selected and requested, for example in an online aggregator, in order to be able to then add it to the local favorites list.

In this case, provision is made for successively stored data, in particular data records assessed and stored in succession and/or identification information identifying data records, to be stored together with the corresponding first assessment information and/or the formatted assessment information in the form of lists, in particular favorites lists and/or playlists, in a storage unit in the motor vehicle, in a storage device of the computer device and/or on a storage medium of the portable communication device. Such lists are preferably created in a plurality of digital stores, for example in the storage unit in the motor vehicle and on the storage medium of the portable communication device used for transmission. The user specification is therefore used to manage a plurality of databases or lists which are then accordingly kept up to date. For example, the databases are updated in such a manner that they contain only the current favorites of the user as entries. The use of a one-off input when assessing the data record to manage a plurality of lists minimizes the amount of effort needed by the user to update his databases.

Provision is made to use social networks, trading platforms and/or television and/or radio broadcasting services, in particular online music services, personalized radio, online aggregators, or providers for netcasts, digital audio books and/or video clips or the like as services which are provided with the corresponding formatted assessment information. The services are, in particular, Internet services. The data record preferably contains media data, in particular audio and/or film data. Alternatively, other suitable data records, for example texts, messages, netcasts, computer games or the like, may also be assessed.

If a radio broadcast received in the motor vehicle, in particular a received music title which is unknown, is intended to be assessed, provision is made to call an external music recognition service which is able to identify meta information, in particular the performer and/or title name, using parts or sections of the data record associated with the music title. This music recognition service is preferably designed to associate the identification information which can be derived from the meta data, in particular, with the data record. The recognition service achieves, in particular, independence from concomitantly transmitted or available meta data relating to the media title currently being played, with the result that analog radio broadcasts or generally analog or digital media without transmitted meta information can also be assessed.

It goes without saying that services which are designed to recognize unknown film data, in particular video clips, can be accordingly linked.

With a sufficiently good assessment, provision is made for further actions to be carried out. For example, the service can automatically submit a purchase offer if an assessed data record corresponding to a music title has been given a sufficiently good assessment. Associated cover art, additional information relating to the artist or performer and/or associated tour dates, lyrics or the like can accordingly be automatically retrieved and can be displayed on a display unit in the motor vehicle or on a display of the communication device.

The inventors also propose a motor vehicle for providing at least one service with at least one item of formatted assessment information associated with a data record, the formatted assessment information having a format which is predefined by the service and is predefined with regard to a multilevel assessment scheme having a number of assessment levels, and, according to the proposal, an input unit, an evaluation unit and a communication unit being permanently installed in the motor vehicle and being operatively connected to one another in such a manner that the input unit detects the user specification, the first assessment information being able to be automatically generated on the basis of the user specification using the evaluation unit, and the formatted assessment information being able to be derived from the first assessment information, and the communication unit being designed at least to indirectly transmit the data record and/or the identification information identifying the data record to the services together with the first assessment information and/or the formatted assessment information.

The communication unit is designed to wirelessly transmit the data record or the identification information unambiguously identifying the data record. In particular, the communication unit can also be used to transmit data to the computer device which is connected to the Internet. In this case, the communication unit is used for indirect transmission, with the result that further computers or transmission devices, in particular those which are designed to wirelessly receive data, may be arranged between the service and/or the computer device.

A storage unit which can store the data record and/or the identification information identifying the data record together with the assessment information and/or the formatted assessment information is preferably connected to the evaluation unit in the motor vehicle. In particular, provision is made to create lists or tables, in particular favorites lists and/or playlists of media titles played in the motor vehicle, in particular music titles.

The storage unit also makes it possible to buffer assessments which have already been made, in particular to hold first assessment information and/or formatted assessment information in the motor vehicle. This allows offline assessment of data records when the connection to the external services, in particular the Internet services, has not been provided. When the connection is provided, the information which has already been acquired and is held in the motor vehicle is transmitted to the external services "online".

The inventors also propose a system for providing at least one service with at least one item of formatted assessment information associated with a data record, the formatted assessment information having a format which is predefined by the service and is predefined with regard to a multilevel assessment scheme having a number of assessment levels, the system being designed to carry out the proposed method. The system comprises an input unit which is designed to detect the user specification and is permanently installed in a motor vehicle and is connected to a portable communication device in such a manner that the first assessment information can be automatically generated on the basis of the user specification using the portable communication device and the formatted assessment information can be derived from the first assessment information, the communication device being designed at least to indirectly transmit the data record and/or the identification information identifying the data record to the services together with the first assessment information and/or the formatted assessment information. The system makes it possible for vehicle occupants to connect to their favorite social networks on the Internet during the journey even if there is no communication unit in the motor vehicle for transmitting data.

The input unit in the motor vehicle is preferably connected to the portable communication device in a wired or wireless manner. Standardized interfaces are used for this purpose, for example USB, W-LAN and/or Bluetooth interfaces.

In one preferred exemplary embodiment, the input unit in the motor vehicle is designed for voice detection. The user specification can therefore be effected acoustically.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
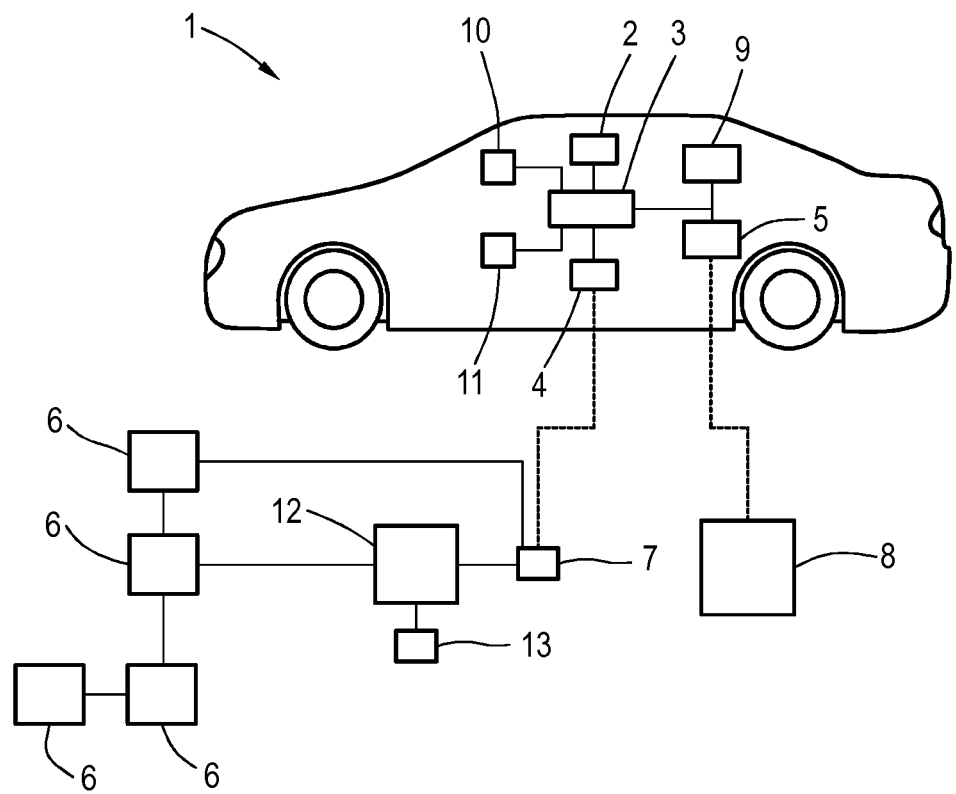
FIG. 1 schematically shows a motor vehicle for providing at least one item of formatted assessment information associated with a data record, FIG. 2 schematically shows a system for providing at least one item of formatted assessment information associated with a data record.

Reference will now be made in detail to the preferred embodiments of the present invention, examples of which are illustrated in the accompanying drawings, wherein like reference numerals refer to like elements throughout.

FIG. 1 shows a motor vehicle 1 which is designed to provide services, in particular Internet services, with formatted assessment information associated with a data record. Each service requires a predefined format which is predefined with regard to a multilevel assessment scheme having a number of assessment levels. In this case, different services may have different formats which differ, in particular, with regard to the number of assessment levels.

The motor vehicle 1 comprises an input unit 2, an evaluation unit 3, a communication unit 4 and a receiving unit 5. The services are installed on Internet computers 6 which are installed in a stationary manner. The communication unit 4 in the motor vehicle is wirelessly connected to a transmission device 7 which is connected to the computers 6. Data are transmitted from the communication unit 4 in the motor vehicle to the services installed on the computers 6 via the transmission device 7. In particular, the formatted assessment information which is associated with the data record and is accordingly evaluated by the services can be transmitted using the communication unit 4 in the motor vehicle and the transmission device 7. The communication unit 4 in the motor vehicle and the transmission device 7 are designed for two-way communication, with the result that data can be interchanged between the motor vehicle 1 and the Internet computers 6 in a two-way manner.

An external transmitting device 8 in the form of a radio transmitter is also shown. The external transmitting device 8 is designed to wirelessly transmit analog or digital media data, in particular audio data. The data records containing the media data can be received in the motor vehicle using a receiving unit 5, in particular a radio receiver of the motor vehicle 1.

Alternatively, the external transmitting device 8 may also be in the form of a television transmitter which transmits analog or digital audio and film data to the motor vehicle 1.

The input unit 2 in the motor vehicle is designed to detect the user specification and communicates with the evaluation unit 3 when detecting the user specification. For this purpose, the input unit 2 in the motor vehicle is designed for voice recognition. The evaluation unit 3 is designed to generate the first assessment information, which is used as a basis for deriving the formatted assessment information, using the user specification.

Data records containing media data can be transmitted to the receiving unit 5 in the motor vehicle using the external transmitting device 8. In the example shown here, the media data are music titles which can be output using an output unit 9 in the form of an audio system in the motor vehicle. Alternatively, local data records may also be reproduced and assessed. For example, provision is made to assess locally played music titles of a CD using the user specification.

The first assessment information associated with the data record can be generated on the basis of the user specification using the evaluation unit 3. The formatted assessment information which corresponds to the formats predefined by the services can accordingly be derived from the first assessment information using the evaluation unit 3. The formatted assessment information can be transmitted from the communication unit 4 in the motor vehicle to the respective computers 6, on which the corresponding services are installed, via the transmission device 7. The motor vehicle 1 is thus designed to determine a plurality of items of formatted assessment information on the basis of an item of first assessment information and to forward said formatted assessment information to respectively corresponding external Internet services.

A display unit 10 in the motor vehicle is additionally provided and can display optical information associated with data records, in particular pages called from the World Wide Web, album covers, films or the like which can be transmitted to the motor vehicle 1 using the communication unit 4. Favorites lists or playlists containing music titles which have been played or are yet to be played in the motor vehicle 1 can also be displayed using the display unit 10. The databases corresponding to the media data, in particular the favorites lists and playlists, can be stored on a storage unit 11 of the motor vehicle 1 which is connected to the evaluation unit 3.

The external services are, for example, social networks, trading platforms and/or television and/or radio broadcasting services. In particular, one of the external services may have a binary assessment scheme comprising only two assessment levels. Another external service comprises, for example, five assessment levels, with the result that more differentiated assessment of the data record can be expressed. The service can carry out further actions depending on the assessment. For example, a music title which has been given a sufficiently good assessment by the user can be automatically offered for purchase by the trading platform.

It goes without saying that the components 2, 3, 4, 5, 9, 10, 11 in the motor vehicle need not be designed as individual devices, but rather can also be integrated, in particular, in one or more components in the motor vehicle.

The transmission device 7 is indirectly connected to the computers 6. In this case, a computer device 12 which forms a server of a network is arranged between the computers 6 and the transmission device 7. The network comprises a multiplicity of motor vehicles 1, with the result that communication between the individual motor vehicles in the network and the Internet is effected via the computer device 12. The computer device 12 has a storage device 13 which can store user data. In particular, favorites lists and/or playlists can be stored on the storage device 13. With a sufficiently good assessment of the data record, provision is made for a corresponding entry to be added to the databases installed on the storage unit 11 in the motor vehicle and the storage device 13. In the case of a data record corresponding to a music title for example, the playlists stored on the storage unit 11 in the motor vehicle are supplemented with an entry containing meta data, in particular the music title name, genre name and/or performer name. At the same time, the database installed on the storage device 13 is accordingly adapted and is likewise supplemented with an entry.

Figure 2:
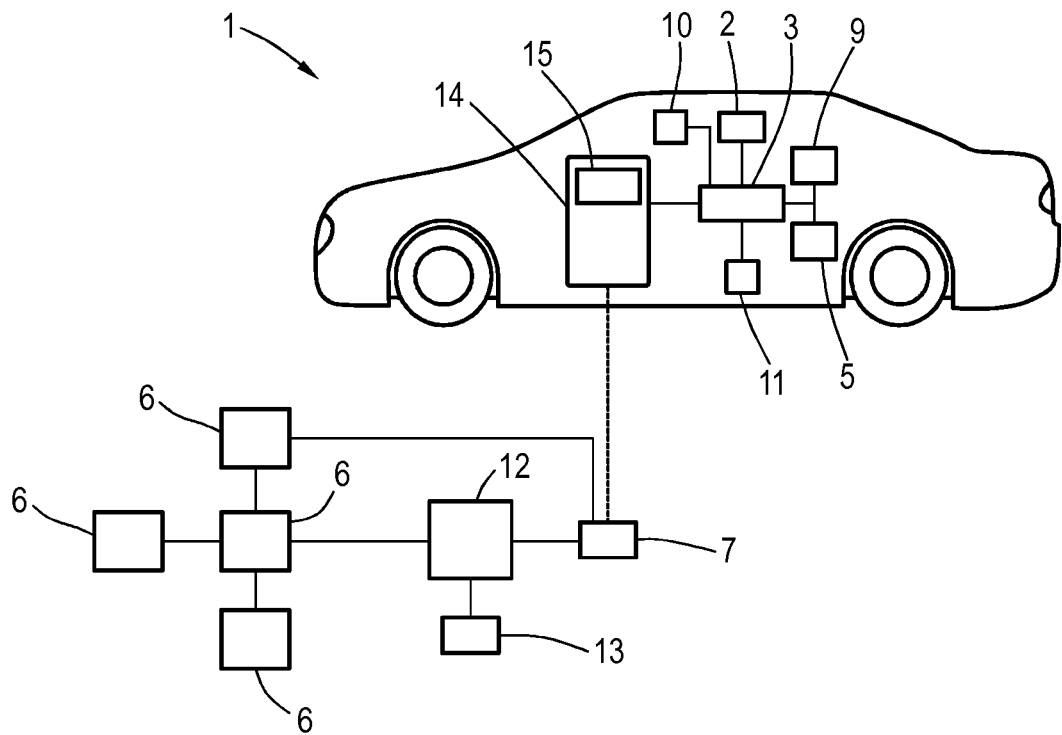

FIG. 2 shows another exemplary embodiment which substantially corresponds to the example shown in FIG. 1. The difference here is that a portable communication device 14, in particular a mobile telephone or a smartphone, is provided for the purpose of evaluating the user specification and transmitting the formatted assessment information to the Internet services. The portable communication device 14 is indirectly wirelessly connected to the input unit 2 in the motor vehicle via the evaluation unit 3 in the motor vehicle. Locally played media data, in particular music titles, or data records received using the receiving unit 5 can therefore be assessed in the motor vehicle 1 on the basis of the user specification which can be detected using the input unit 2. The first assessment information and the formatted assessment information can be generated on the basis of the user specification using the portable communication device 14.

The communication device 14 has a storage medium 15 which can store databases, in particular playlists and/or favorites lists. Provision is also made here for the database of the communication device 14 to be supplemented with a corresponding entry if a data record is given a sufficiently good assessment. In particular, this may be effected in addition to adapting the databases of the storage device 13 and/or of the storage unit 11.

The formatted assessment information can be transmitted to the services installed on the computers 6 via the transmission device 7 using the portable communication device 14.

Figure 3:
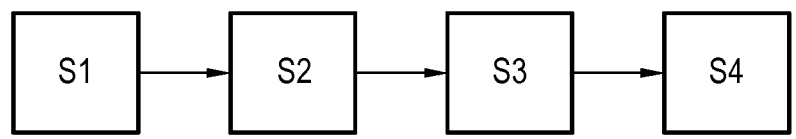
FIG. 3 shows a schematic flowchart of a method for providing the formatted assessment information.

FIG. 3 shows a method for providing the external services with the formatted assessment information associated with the data record. In this case, in a first step S1, the data record is wirelessly transmitted from the external transmitting device 8 to the receiving unit 5 in the motor vehicle and is reproduced. Alternatively, a music title which is locally present and is stored, for example, on the storage unit 11 in the motor vehicle can be played in the motor vehicle 1 in the first step S1. In a second step S2, the received data record or the data record corresponding to the music title played is then assessed using the user specification. The user specification is detected, for example, using the input unit 2 designed for voice detection. Alternatively, the user specification can also be effected using other man-machine interfaces and may comprise, for example, an input using a keyboard or a touch-sensitive display. The first assessment information is generated on the basis of the user specification using the evaluation unit 3 or the portable communication device 14. In a third step S3, the formatted assessment information respectively corresponding to the formats predefined by the services is then derived from the first assessment information. The formatted assessment information is derived from the first assessment information using the evaluation unit 3 in the motor vehicle or the portable communication device 14, for example. In a fourth step S4, the formatted assessment information is transmitted to the services, the portable communication device 14 or a communication unit 4 in the motor vehicle being used for wireless transmission, for example. The external service provides a service and/or a product on the basis of the assessment of the data record in one of the assessment levels of the underlying assessment scheme.

For example, a music title which is not yet owned by the user and has been assessed may be offered for purchase by the external service if a sufficiently good assessment has been given. This may require, for example, the user assessment to correspond to at least one of the two highest assessment levels in a five-level assessment scheme. The music file corresponding to the music title, in particular in the MP3 format, can be transmitted to the storage device 13 of the computer device 6, the storage medium 15 of the portable communication device 14 and/or the storage unit 11 of the motor vehicle 1 for use after the user has accepted the purchase offer. The playlists or databases installed on the storage unit, in particular on the storage device 13, on the storage medium 15 and/or on the storage unit 11 of the motor vehicle 1 are additionally supplemented with a corresponding entry.

In an alternative exemplary embodiment, an item of identification information identifying the data record is transmitted to the services in the fourth step S4 instead of the data record. In particular, the identification information may be a character string which identifies media data, in particular film or audio data. In order to associate the identification information with the corresponding media data item, it is possible to compare the identification information with an Internet-based identification service.

When transmitting the data record from the external transmitting device 8 to the receiving unit 5 in the motor vehicle, provision may be made to additionally transmit meta data which are associated with the data record and comprise the title name, the genre name and/or the performer name. The identification information can be derived from the title name and the performer name, for example.

Provision is also made to transmit the meta data to the external services if necessary and to therefore make said data available to the latter. In the case of an external service in the form of a broadcasting service, this makes it possible to analyze the meta data, with the result that a musical taste of the user, for example, can be estimated using the previously reproduced music titles characterized by title names, genre names and performer names. Personalized radio broadcasts are then provided, in which selected music titles are transmitted in a manner corresponding to the analysis of the user's musical taste.

In exemplary embodiments which provide for the identification information to be transmitted together with the formatted assessment information associated therewith, the identification information is accordingly stored on the storage unit 11, the storage device 13 and/or the storage medium 15 in the case of a sufficiently good assessment. Successively transmitted data records and/or identification information is/are stored on the storage unit 11, 13, 15 in the form of databases. In this case, provision is made for all databases provided to be accordingly adapted in the case of a corresponding user specification, in particular in the case of a corresponding assessment, which minimizes the operating effort for the user.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for providing formatted assessment information associated with a data record, comprising:
   generating first assessment information associated with the data record, the first assessment information being generated based on a detected user specification;
   deriving a plurality of items of formatted assessment information associated with the data record, the plurality of items of formatted assessment information being derived from the first assessment information, the plurality of items of formatted assessment information having formats corresponding to predefined format specifications of respective different services, each predefined format specification being with regard to a multilevel assessment scheme of the respective different service, each multilevel assessment scheme having a plurality of assessment levels; and
   making the plurality of items of formatted assessment information available to the respective different services,
   wherein the predefined format specifications of respective different services include:
   a first predefined format specification corresponding to a multilevel assessment scheme having two levels for a first service, and a second predefined format specification corresponding to another multilevel assessment scheme having more than two levels for a second service.

2. The method according to claim 1, wherein the user specification is detected using an input unit in a motor vehicle.

3. The method according to claim 2, wherein
   the input unit is designed for voice detection in the motor vehicle, and
   the user specification is detected acoustically.

4. The method according to claim 2, wherein
   the first assessment information is generated using an evaluation unit in the motor vehicle, which is connected to the input unit in the motor vehicle, or
   the first assessment information is generated using a portable communication device.

5. The method according to claim 4, wherein
the plurality of items of formatted assessment information are derived from the first assessment information using the evaluation unit in the motor vehicle, or
the plurality of items of formatted assessment information are derived from the first assessment information using the portable communication device, or
the plurality of items of formatted assessment information are derived from the first assessment information using a computer device connected to the Internet, the first assessment information being transmitted to the computer device during evaluation in the computer device.

6. The method according to claim 4, wherein
transmission data are transmitted, the transmission data being the first assessment information or the plurality of items of formatted assessment information,
the transmission data are transmitted to a computer device or to at least one of the different services,
the transmission data are transmitted using the portable communication device or using a communication unit in the motor vehicle, and
the communication unit is connected to the input unit in the motor vehicle or to the evaluation unit.

7. The method according to claim 4, wherein
transmission data are transmitted, the transmission data being the first assessment information or the plurality of items of formatted assessment information,
the transmission data are transmitted to a computer device or to at least one of the different services,
the transmission data are transmitted using the portable communication device,
the portable communication device is connected in a wireless or wired manner, to the input unit in the motor vehicle and/or to the evaluation unit.

8. The method according to claim 1, wherein
transmission data are transmitted, the transmission data being the first assessment information and/or the plurality of items of formatted assessment information, and
the transmission data are transmitted together with the data record or an item of identification information identifying the data record, such that an association of the transmission data with the data record is retained during transmission.

9. The method according to claim 1, wherein
the data record and/or identification information identifying the data record is/are stored together with the first assessment information and/or the plurality of items of formatted assessment information if the first assessment information reaches or exceeds a predefinable threshold value.

10. The method according to claim 9, wherein
each time the first assessment information reaches or exceeds a predefinable threshold value, a data entry is stored such that successively stored data are stored as a list, and
the list is stored in a storage unit in a motor vehicle, in a storage device of an external computer device and/or on a storage medium of a portable communication device.

11. The method according to claim 1, wherein
making the plurality of items of formatted assessment information available to the respective different services further comprises transmitting a comment from the user to the respective different services, the comment being associated with the plurality of items of formatted assessment information.

12. The method according to claim 1, wherein
making the plurality of items of formatted assessment information available to the respective different services further comprises transmitting the data record or an item of identification identifying the data record to the respective different services.

13. The method according to claim 1, further comprising:
receiving an offer to purchase the data record or a product related to the data record from at least one of the respective different services based on the item of formatted assessment information made available to the at least one of the respective different services.

14. The method according to claim 1, wherein
deriving the plurality of items of formatted assessment information associated with the data record comprises using a translation table to associate an assessment level for each multilevel assessment scheme with a value corresponding to the first assessment information.

15. A motor vehicle to provide formatted assessment information associated with a data record, comprising:
an input unit permanently installed in the motor vehicle to detect a user specification;
an evaluation unit permanently installed in the motor vehicle and operatively connected to the input unit, to:
automatically generate first assessment information based on the user specification, and
derive a plurality of items of formatted assessment information associated with the data record, the plurality of items of formatted assessment information being derived from the first assessment information, the plurality of items of formatted assessment information having formats corresponding to predefined format specifications of respective different services, each predefined format specification being with regard to a multilevel assessment scheme of the respective different service, each multilevel assessment scheme having a plurality of assessment levels; and
a communication unit permanently installed in the motor vehicle and operatively connected to the input unit and the evaluation unit, to transmit the data record and/or information identifying the data record to the different services together with the first assessment information and/or the plurality of items of formatted assessment information,
wherein the predefined format specifications of respective different services include:
a first predefined format specification corresponding to a multilevel assessment scheme having two levels for a first service, and a second predefined format specification corresponding to another multilevel assessment scheme having more than two levels for a second service.

16. The motor vehicle according to claim 15, further comprising a storage unit to store the data record and/or the identification information identifying the data record together with the first assessment information and/or the plurality of items of formatted assessment information, the storage unit being connected to the evaluation unit.

17. A system to provide formatted assessment information associated with a data record, comprising:
an input unit permanently installed in a motor vehicle to detect a user specification;
a portable communication device connected to the input unit, to:
automatically generate first assessment information based on the user specification, derive a plurality of items of formatted assessment information associated with the data record, the plurality of items of formatted assessment information being derived from the first assessment information, the plurality of items of formatted assessment information having formats corresponding to predefined format specifications of respective different services, each predefined format specification being with regard to a multilevel assessment scheme of the respective different service, each multilevel assessment scheme having a plurality of assessment levels, and transmit the data record and/or information identifying the data record to the different services together with the first assessment information and/or the plurality of items of formatted assessment information, wherein the predefined format specifications of respective different services include:

a first predefined format specification corresponding to a multilevel assessment scheme having two levels for a first service, and a second predefined format specification corresponding to another multilevel assessment scheme having more than two levels for a second service.

18. The system according to claim 17, wherein the input unit is connected to the portable communication device in a wired and wireless manner.

19. The system according to claim 17, wherein the input unit is designed for voice detection.

\* \* \* \* \*